UNITED STATES PATENT OFFICE.

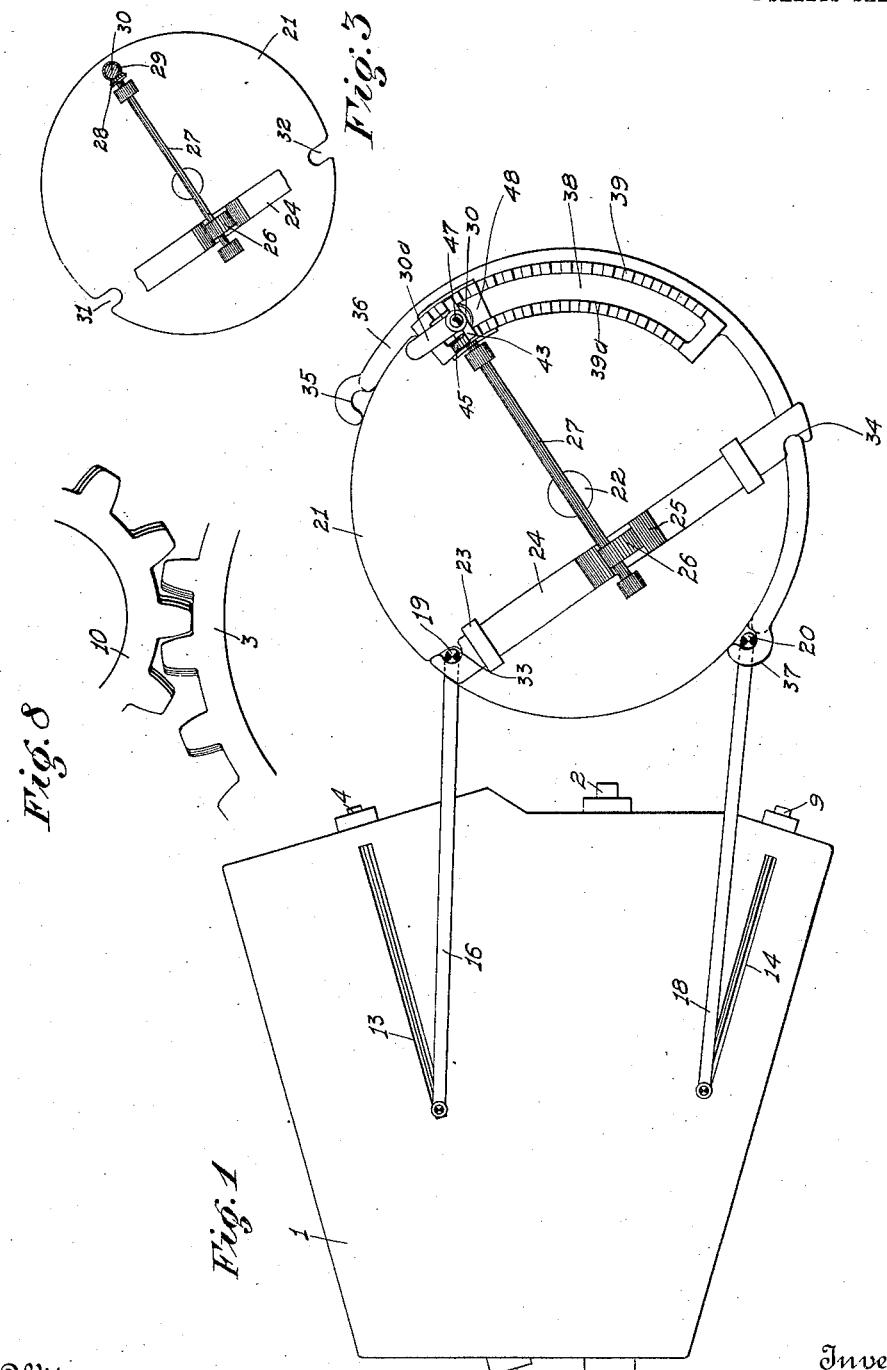

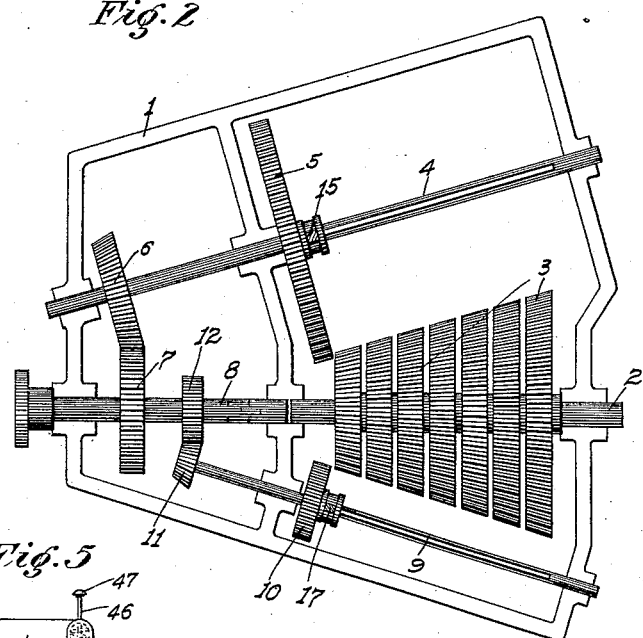
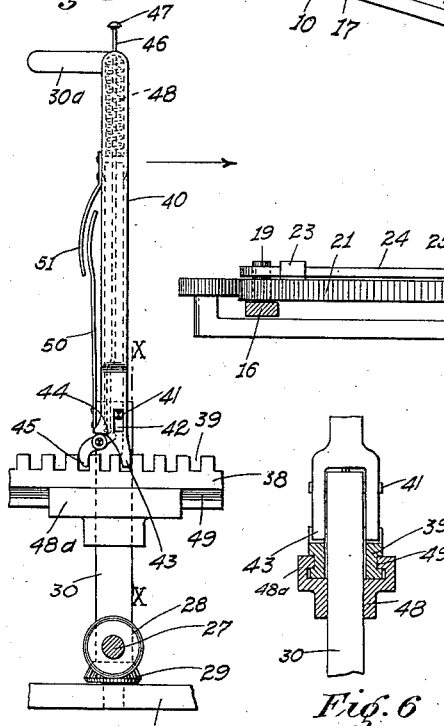
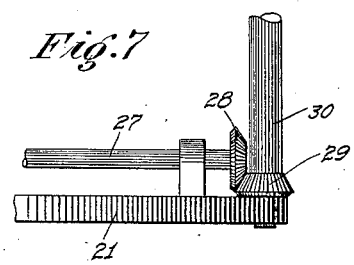

ALFRED N. ADAMS, OF STOCKTON, CALIFORNIA.

TRANSMISSION-GEARING.

1,065,996. Specification of Letters Patent. Patented July 1, 1913.

Application filed August 23, 1911. Serial No. 645,593.

*To all whom it may concern:*

Be it known that I, ALFRED N. ADAMS, a citizen of the United States, residing at Stockton, in the county of San Joaquin, State of California, have invented certain new and useful Improvements in Transmission-Gearing; and I do declare the following to be a full, clear, and exact description of the same, such as will enable others skilled in the art to which it appertains to make and use the same, reference being had to the accompanying drawing, and to the characters of reference marked thereon, which form a part of this application.

This invention relates to improvements in gearings for motor operated mechanisms, and particularly to the transmission gearing therefor, and is especially designed as an improvement upon transmission gearing heretofore patented to me, which patent is dated the 17th day of May, 1910, and is numbered 958,061. The gearing herein shown is substantially the same as the gearing shown in that patent and the method of connecting the gearing with the driving and driven shafts is substantially the same, as shown in that patent, this present invention covering a means for shifting the sliding change speed gearing which move over the variable speed cone gears. I also embody a double sliding change gear which is an addition to the structure shown in the above named patent.

The object of the invention is to produce a simple and rapid method of shifting the sliding change gears over the cone and also change from below direct drive to direct drive and from direct drive to above direct drive in a rapid and uninterrupted manner as is desirable especially in use with automobiles or other tractive vehicles.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a top plan view of the transmission box in my improved shifting mechanism. Fig. 2 is a view of the transmission box with the top plate removed. Fig. 3 is a top plan view of a shifting wheel. Fig. 4 is a side elevation of the same. Fig. 5 is a side elevation of the lever structure. Fig. 6 is a sectional view taken on a line X—X of Fig. 5. Fig. 7 is a fragmentary view showing a gear connection. Fig. 8 is a fragmentary view of intermeshing gears showing a gear tooth structure.

Referring now more particularly to the characters of reference on the drawings, 1 designates the transmission box.

The numeral 2 designates the driving shaft connected with the engine in the usual manner and mounted on this shaft is a variable speed cone comprising a plurality of beveled gears 3 forming in their entirety a cone as shown in Fig. 2.

The numeral 4 designates the intermediate driven shaft for driving at a speed lower than direct drive and up to direct drive on which shaft 4 is a sliding gear 5 adapted to engage the gears 3 and another gear 6 engaging a gear 7 on the driven shaft 8 connected with the object to be driven.

The numeral 9 designates the intermediate driven shaft for driving at a speed from direct drive to a speed higher than direct drive and the numeral 10 designates a sliding gear sliding on said shaft 9 and adapted to engage the gears 3, while 11 is another gear connecting with a gear 12 on the driven shaft 8.

In the top of the transmission box 1 are two slots 13 and 14 for each of the gears 5 and 10 respectively, there being a yoke 15 connecting the gear 5 with a rod 16 and a yoke 17 connecting the gear 10 with a rod 18, such rods 16 and 18 having upwardly projecting pins 19 and 20 respectively on their outer ends.

The numeral 21 designates a wheel turnably mounted on a pin 22 and having guides 23 through which is movable a rod 24. Such rod 24 has a pair of spaced curving lugs 25 between which is a movable cam 26 on a shaft 27 suitably journaled on the top of the wheel 21 and having a beveled gear 28 intermeshing with the beveled gear 29 on a vertical lever 30 journaled in the wheel 21. The wheel 21 is provided at spaced points with recesses 31 and 32 and the rod 24 is provided with recesses or jaws 33 and 34.

In practice when it is desired to slide the gear 5, the wheel 21 is turned to such a position that the pin 19 may be inserted into the recess 31. When in this position the gear 5 would be in the neutral position shown in Fig. 2, the pin 19 would be in the recess 31, and the rod 24 would be in such position that the jaw 33 would be engaging the pin 19 and holding it in locked position in the recess 31. Under these same conditions, the gear 10 would be in neutral position as shown in Fig. 2 and the pin 20 would be disposed in a recess 37 in a frame 36 which frame is disposed circumferentially around the wheel 21 and is provided with a recess 35 at its other end. By operating the lever 30 the wheel 21 is then turned in such a direction as to carry the pin 19 toward the recess 35 and this operation drags the gear 5 along the cone of gears 3 until it passes off of such cone of gears into a neutral position. When this neutral position is reached the lever 30 is turned by means of a handle 30ª, which operation causes the gears 29 and 28 to turn, thus turning the shaft 27 which shifts the cam 25 and moves the rod 24 diametrically across the wheel 21. This operation moves the pin 19 out of the recess 31 in the wheel 21 and into the recess 35 in the frame 36. In the meantime, when the wheel 21 has been moved carrying the pin and gear to the positions noted this same operation has caused the jaw 34 to engage the pin 20 and move it out of the recess 37 and into the recess 32 where it is locked in position by such jaw 34. The carrying of the pin 19 and the gear 5 to the positions noted, will, as can readily be seen, cause the speed of the vehicle to increase from a point below the direct drive of the engine to a direct drive since gears 3 and 5 are of substantially the same diameter, and as it is of course desired to increase the speed from direct drive to greater than direct drive, then this is done by shifting the gear 10 in the following manner, viz: The operation of the wheel 21 is reversed from that movement described above which reversing movement carries the recess 31 away from the recess 35 leaving the pin 19 locked in the recess by means of the periphery of said wheel 21 and this same movement carries the pin 20 in such a direction as will drag the gear 10 along the cone of gears 3 until it reaches the end of said cone and then to reduce the speed from greater than direct drive to direct drive this last named operation is reversed and the pin 20 then moves back until the recess 31 registers with the recess 35 and the recess 32 registers with the recess 37 and this is the position in which the direct drive is given. Then to decrease the speed from direct drive to less than direct drive the rod 24 is again shifted throwing the pin 20 into the recess 37 and taking the pin 19 out of the recess 35 and into the recess 31. Then the wheel 21 is moved to substantially the position shown in Fig. 3, which, as was indicated at the beginning of this description, is the point at which the gear 5 is in a neutral position as shown in Fig. 2.

The lever 30 projects through a slotted guide 38 having rack teeth 39 and said lever 30 is provided above said rack with an auxiliary lever 40 pivoted to said member 30 by means of pins 41 movable through vertical slots 42 in said member 40. Said member 40 has downwardly projecting lugs 43 which fit into the rack teeth 39 and have a curved surface 44 projecting over dogs 45 pivoted to the member 30 and connected by a link 46 through the member 40 with a thumb member 47. There is a spring 48 connected with the member 46 within the member 40 which holds the dog 45 in normal engagement with the rack teeth 39.

When it is desired to move the lever 30 in the direction indicated by the arrow in Fig. 5, the member 40 is moved in that direction. The engagement of the members 43 with the teeth 39 forms a fulcrum on which the member 40 may be pivoted. By reason of the pins 41 in the slots 42 the pivotal movement of the member 40 will move the lever 30 in unison therewith; hence the member 40 and the lever 30 can be moved on such pivotal point until the dogs 45 engage the next set of teeth adjacent to the said set which they engage when the member 40 is in vertical position. Then by moving the member 40 in the opposite direction, using the engagement of the dogs 45 with the teeth 39 as the fulcrum means, this causes the curving portions 44 to ride over the dogs 45 and lift the member 40 upward, which is permitted by the pins 41 and slots 42. This action lifts the members 43 out of the teeth 39 which they were then engaging, and then they may be brought into engagement with the adjacent set of teeth, and this operation may be repeated for the full length of the rack if desired.

The normal vertical position of the member 40 may be maintained by two opposed springs 50 and 51 secured on the members 30 and 40 respectively, the resiliency of one against the other causing the member 40 to have a tendency to at all times maintain its rigid vertical position.

When the lever is turned to operate the gears 29 and 28 the members 43 and 45 are, of course, turned completely around to fit into the teeth 39 in the opposite direction whereupon to move the gears the other way, the same operation above described is repeated, but only in the other direction along the teeth 39.

The member 30 is provided with a guide member 48ª movable in slots 49 in the guide 38.

From the foregoing description it will readily appear that I have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

1. A device of the character described comprising a driving shaft and a plurality of driven shafts, a cone of gears on said driving shaft, a sliding gear on each of said driven shafts adapted to engage said cone of gears, a turnable wheel and means connected between said wheel and said sliding gears for sliding such gears at independent times with respect to each other, as described.

2. A device of the character described comprising a driving shaft, a plurality of driven shafts, a cone of gears on said driving shaft, a sliding gear on each of said driven shafts adapted to engage said cone of gears, a rotatable wheel having a plurality of spaced recesses, a rod adapted to connect each of said sliding gears with one of said recesses, means for turning said wheel, means for disengaging one of said rods from its recess and simultaneously engaging the other rod in its recess, as described.

3. A device of the character described comprising a cone of gears, a plurality of sliding gears adapted to engage said cone of gears, a turnable wheel having a plurality of spaced recesses, a bar slidable across said wheel and having a jaw in each end adapted to coincide with one of said recesses, and bars connected with said sliding gears, and adapted to engage said recesses, as described.

4. A device of the character described comprising a driving shaft, a plurality of driven shafts, a cone of gears on said driving shaft, a sliding gear on each of said driven shafts adapted to engage said cone of gears, a turnable wheel, means connected between said wheel and said sliding gears for sliding such gears at independent times with respect to each other, and a lever for operating said turnable wheel, such lever comprising a lever proper, an independent member slidable vertically on said lever proper, a tooth rack, fixed lugs on said slidable member engaging the teeth of said rack, and spring pressed dogs pivoted on said lever proper and engaging said toothed rack, said lever having curving surfaces adapted to move over the surface of said dogs, as described.

In testimony whereof I affix my signature in presence of two witnesses.

ALFRED N. ADAMS.

Witnesses:
JOSHUA B. WEBSTER,
FRANK H. CARTER.